(12) United States Patent
Titus

(10) Patent No.: US 12,043,140 B2
(45) Date of Patent: Jul. 23, 2024

(54) RECHARGEABLE BATTERY INCLUDING POWER CONNECTION CONDITION MONITORING SYSTEM

(71) Applicant: Neutron Holdings, Inc., San Francisco, CA (US)

(72) Inventor: Andrew Titus, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 94 days.

(21) Appl. No.: 16/887,539

(22) Filed: May 29, 2020

(65) Prior Publication Data

US 2020/0376983 A1  Dec. 3, 2020

Related U.S. Application Data

(60) Provisional application No. 62/854,203, filed on May 29, 2019.

(51) Int. Cl.
*B60L 58/25* (2019.01)
*B60L 53/80* (2019.01)
(Continued)

(52) U.S. Cl.
CPC ............... *B60L 58/25* (2019.02); *B60L 53/80* (2019.02); *G01K 3/005* (2013.01); *H01M 10/425* (2013.01); *H01M 10/486* (2013.01); *H02J 7/0047* (2013.01); *H02J 7/0068* (2013.01); *H04W 4/40* (2018.02); *B60L 58/16* (2019.02); *B60L 2200/12* (2013.01);
(Continued)

(58) Field of Classification Search
CPC .......... B60L 53/60; B60L 53/62; B60L 58/24; B60L 58/25; H02J 7/007194; H02J 7/0088; H02J 7/0091; H01M 10/433; H01M 10/486; G01R 31/364; G01R 31/374
USPC ......................................... 320/109, 150–155
See application file for complete search history.

(56) References Cited

U.S. PATENT DOCUMENTS 5,666,040 A  9/1997 Bourbeau
8,179,139 B2  5/2012 Kawasumi et al.
(Continued)

OTHER PUBLICATIONS

International Search Report and Written Opinion issued Oct. 19, 2020 in International Patent Application No. PCT/US2020/35255, 15 pages.

(Continued)

*Primary Examiner* — Nathaniel R Pelton
(74) *Attorney, Agent, or Firm* — Dentons US LLP

(57) ABSTRACT

This disclosure generally relates to a rechargeable battery for electric vehicles. The rechargeable battery may include a housing that includes a first temperature sensor to sense a first temperature of a first power connection terminal of the rechargeable battery and a second temperature sensor within the housing to sense a second temperature of a second power connection terminal of the rechargeable battery. The rechargeable battery may also include a battery management system located within the housing, where the battery management system causes a reduction in an amount of current through at least one of the first power connection terminal or the second power connection terminal when a temperature associated with at least one of the first power connection terminal or the second power connection terminal exceeds a threshold.

15 Claims, 11 Drawing Sheets

(51) Int. Cl.
  *G01K 3/00* (2006.01)
  *H01M 10/42* (2006.01)
  *H01M 10/48* (2006.01)
  *H02J 7/00* (2006.01)
  *H04W 4/40* (2018.01)
  *B60L 58/16* (2019.01)
  *B62J 43/13* (2020.01)
  *B62K 11/00* (2006.01)

(52) U.S. Cl.
  CPC ..... *B60L 2200/24* (2013.01); *B60L 2240/545* (2013.01); *B62J 43/13* (2020.02); *B62K 11/00* (2013.01); *H01M 2010/4271* (2013.01); *H01M 2220/20* (2013.01)

(56) References Cited

U.S. PATENT DOCUMENTS

| | | | |
|---|---|---|---|
| 8,587,907 B2 | 11/2013 | Gaben | |
| 9,331,365 B2 | 5/2016 | Cruise et al. | |
| 2004/0145352 A1 | 7/2004 | Harrison | |
| 2010/0194398 A1 | 8/2010 | Kawasumi et al. | |
| 2011/0246014 A1* | 10/2011 | Sauper | H01R 13/665 |
| | | | 439/620.21 |
| 2012/0261397 A1* | 10/2012 | Schwarz | H01M 10/637 |
| | | | 219/202 |
| 2013/0169261 A1 | 7/2013 | Fendt et al. | |
| 2013/0338865 A1* | 12/2013 | Kryze | B60L 50/20 |
| | | | 701/22 |
| 2016/0181845 A1* | 6/2016 | Resnick | H02J 7/0013 |
| | | | 320/136 |
| 2017/0144562 A1 | 5/2017 | Thomas et al. | |
| 2018/0244165 A1 | 8/2018 | Anma et al. | |
| 2019/0036178 A1* | 1/2019 | Karner | H02J 7/0047 |
| 2019/0207267 A1* | 7/2019 | Vickery | B60L 53/66 |
| 2019/0375309 A1* | 12/2019 | Fuhrer | B60L 53/18 |

OTHER PUBLICATIONS

Bella H. Chudnovsky Ed—Anonymous: "Electrical Contacts Condition Diagnostics Based on Wireless Temperature Monitoring of Energized Equipment", Electrical Contacts, The Fifty-Second IEEE Holm Conference On, IEEE, PI, Sep. 1, 2006, pp. 73-80, XP031010064, ISBN: 978-1-4244-0581-7.

Extended European Search Report issued May 31, 2023 in corresponding Application No. 20812970.0, 10 pages.

\* cited by examiner

Example 1

| BATTERY_ID | TEMP_ID | LOCATON | CYCLE_COUNT | TIMESTAMP |
|---|---|---|---|---|
| BATTERY_A | TEMP_SENS_A | Lat. A, Long. A | 102 | TIME_A |
| BATTERY_A | TEMP_SENS_B | Lat. A, Long. A | 102 | TIME_B |
| BATTERY_A | TEMP_SENS_C | Lat. B, Long. B | 128 | TIME_C |
| BATTERY_A | TEMP_SENS_C | Lat. C, Long. C | 132 | TIME_D |

FIG. 10

RECHARGEABLE BATTERY INCLUDING POWER CONNECTION CONDITION MONITORING SYSTEM

CROSS-REFERENCE TO RELATED APPLICATIONS

This application claims the benefit of U.S. Provisional Application No. 62/854,203 filed May 29, 2019, which is this application incorporates in its entirety.

BACKGROUND

Electric vehicles (e.g., scooters, bicycles, etc.) are typically powered by a power source such as, for example, a rechargeable battery. In some cases, the rechargeable battery may be removably coupled to an electric vehicle. This enables a user to swap a rechargeable battery with little or no remaining power with another rechargeable battery (e.g., one that has more power or has been fully charged). However, as the rechargeable batteries are swapped, they may become damaged (e.g., by a user inadvertently dropping the rechargeable battery).

SUMMARY

When a battery swap occurs for an electric vehicle, an individual may remove the rechargeable battery from the electric vehicle, place the removed rechargeable battery in a charging station, select a new rechargeable battery, and secure the new rechargeable battery to the electric vehicle. During the swap process, a receiving portion of the rechargeable battery generally configured to receive an attachment portion of the electric vehicle or charging station at least partially secures the rechargeable battery. That is, battery connector terminals disposed within the receiving portion of the rechargeable battery may be constructed and arranged to engage battery contacts disposed at the battery attachment portion of the electric vehicle or charging station. Each battery connector terminal may be electrically coupled to one or more battery cells disposed within the rechargeable battery housing and may be configured to provide a connection to route power from the rechargeable battery to the electric vehicle or route power from the charging station to the rechargeable battery.

As the electric vehicle, charging station, and the rechargeable battery for the electric vehicle may be located outdoors or otherwise operated outdoors, the attachment portion of the electric vehicle or charging station and the receiving portion of the rechargeable battery may be exposed to various weather conditions, vandalism, abuse, and other damage (either intentional damage or accidental damage). As a result, corrosion of the power connector terminals and contacts and/or damage to the power connector terminals and contacts may occur and may affect how electrical power is transferred from the charging station to the rechargeable battery and/or the rechargeable battery to the electric vehicle. As one example, a power connector terminal constructed of a conductive material may suffer from effects of oxidation. Oxidation generally causes a non-conductive oxide surface or non-conductive oxide layer to form on the conductive material and therefore may limit a surface area of conduction. While conduction may occur through the oxidized surface, such conduction may add resistance when electrical charge flows through the conductor and therefore generate excess heat. In another example, a power connector terminal and/or contact may be damaged and therefore deformed. Since a deformed power connector terminal may not engage the corresponding contact as it once did, a contact surface area between the power connector terminal and the contact may be reduced, ultimately restricting the flow of electrical charge and therefore generating excess heat.

Accordingly, the present disclosure describes various technical improvements for monitoring the condition of rechargeable battery power connector terminals. For example, the present disclosure describes utilizing temperature sensors, such as thermistors connected to one or more digital-to-analog converters, in proximity to each rechargeable battery power connector terminal to determine a condition of the power connector terminal. In some instances, the power connector terminal may degrade over time due in part to power connector terminal corrosion and/or a buildup of other material on the power connector terminal. In other instances, the power connector terminal may become degraded due in part to damage inflicted on the power connector terminal. The degradation of each power connector terminal may increase a resistance at which the power connector terminal operates thereby increasing a sensed temperature of the power connector terminal for a given amount of current flowing through the power connector terminal. Accordingly, throughout charging and discharging cycles of the rechargeable battery, an amount of current flowing through each power connector terminal may be obtained such that the power connector terminal temperature and an amount of current flowing through the power connector terminal may be tracked over time.

The temperature sensor(s) in proximity to the power connector terminals of the rechargeable battery may be directly connected to the power connector terminal and/or in close proximity to the power connector terminal such that a temperature of the power connector terminal may be obtained. In some instances, discrepancies between a temperature of one power connector terminal and a temperature of another power connector terminal may be observed and may indicate an issue affecting a single power connector terminal. In accordance with at least one example of the present disclosure, temperature readings of the temperature sensors may be provided for analysis and may be utilized to determine abnormalities associated with rechargeable batteries and/or specific to one or more geographic locations. In some instances, depending on temperature readings, and whether they differ significantly from other sensor readings or exceed a threshold, an amount of current may be limited based on the temperature readings from one or more temperature sensors.

In accordance with at least one example of the present disclosure, a rechargeable battery is provided. The rechargeable battery may include a housing, a first temperature sensor within the housing to sense a first temperature of a first power connection terminal of the rechargeable battery, and a second temperature sensor within the housing to sense a second temperature of a second power connection terminal of the rechargeable battery. The rechargeable battery may include a battery management system within the housing, where the battery management system causes a reduction in an amount of current through at least one of the first power connection terminal or the second power connection terminal when a temperature associated with at least one of the first power connection terminal or the second power connection terminal exceeds a threshold.

In accordance with at least one example of the present disclosure, a method for monitoring a condition of a power connection terminal of a rechargeable battery is provided.

The method may include receiving an indication of a first temperature associated with a first power connection terminal of a rechargeable battery, receiving an indication of a second temperature associated with a second power connection terminal of the rechargeable battery, and modifying at least one operation of the rechargeable battery based, at least in part, on the least one of the first temperature or the second temperature.

In accordance with at least one example of the present disclosure, an electric vehicle is provided. The electric vehicle may include at least one electric motor, at least one rechargeable battery, the rechargeable battery including a first power connection terminal portion, and at least one battery holster configured to receive the rechargeable battery. The at least one battery holster may include a second power connection terminal portion configured to contact the first power connection terminal portion when the rechargeable battery is inserted into the at least one battery holster. Moreover, the at least one rechargeable battery may include a housing containing a battery management system and a first temperature sensor within the housing to sense a temperature of a portion of the first power connection terminal portion located within the housing. Accordingly, the battery management system may cause a reduction in an amount of current provided to the at least one electric motor when a temperature associated with the portion of the first power connection terminal portion exceeds a threshold.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 10 illustrates a data structure for storing temperature data according to one or more examples.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a rechargeable battery for an electric vehicle (e.g., scooters, bicycles, etc.). The rechargeable battery may be removable from the electric vehicle and placed in a kiosk (also referred to herein as a battery kiosk) to receive a charge. Each of the rechargeable batteries in the battery kiosk may be swapped for other rechargeable batteries with little or no remaining power. For example, as an individual uses an electric vehicle, power stored by the rechargeable battery of the electric vehicle may be consumed and, if not recharged, eventually depleted. Once this occurs, the individual may remove the rechargeable battery from the electric vehicle and use the battery kiosk to exchange the depleted rechargeable battery for a rechargeable battery having a full charge or otherwise available to the individual. That is, the individual may swap the depleted rechargeable battery with one that is fully charged or mostly fully charged. To help ensure or increase the probability that the battery being taken from the kiosk is in good condition, the rechargeable battery may communicate with the kiosk, electric vehicle, and/or a mobile device (e.g., through a network service) to inform the kiosk of one or more battery parameters relating to the condition of the rechargeable battery. The condition may correspond to a temperature corresponding to one or more power connector terminals during use or charging. To protect the rechargeable battery from causing damage to itself, a charging kiosk, and/or an electric vehicle, the rechargeable battery may perform an action, either initiated by the rechargeable battery or an external device, such that the rechargeable battery limits an amount of current that flows through the one or more power connector terminals.

Figure 1:
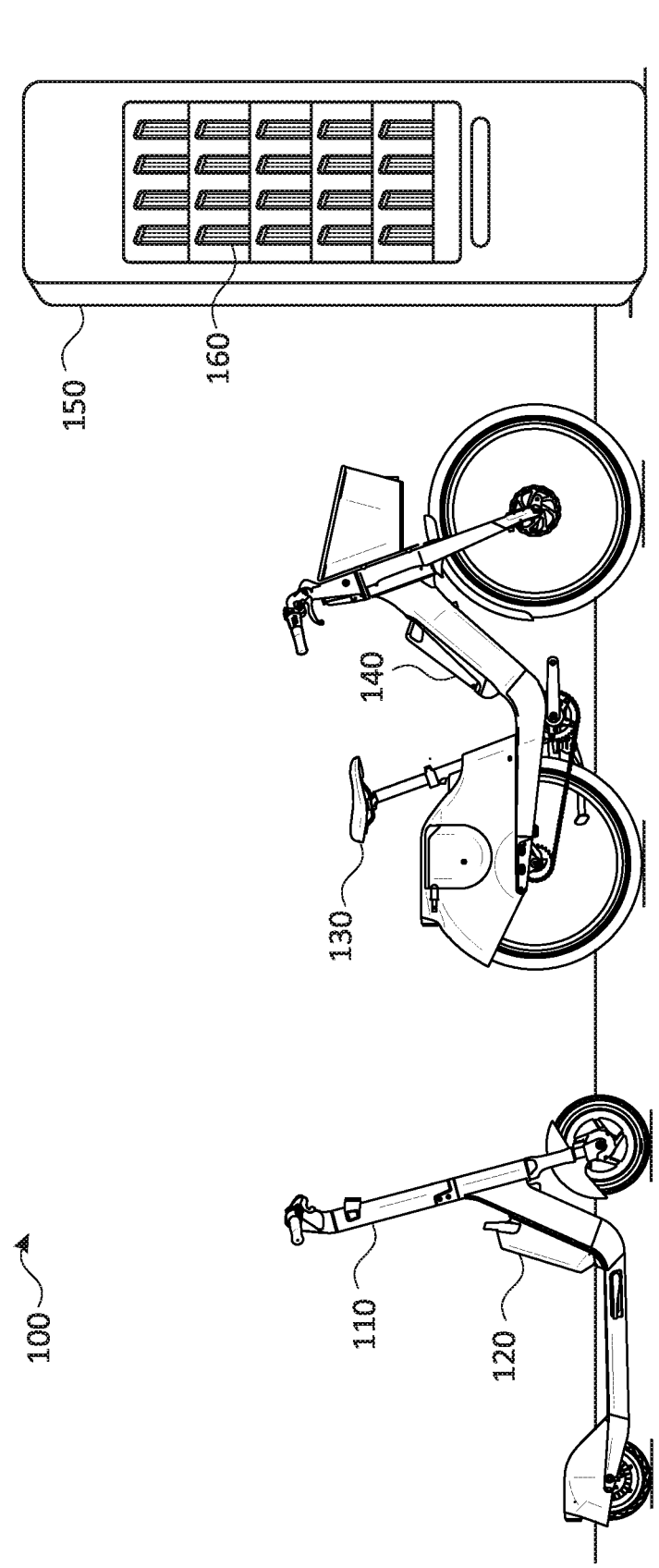
FIG. 1 illustrates an example environment in which a rechargeable battery kiosk receives and distributes rechargeable batteries for different kinds of electric vehicles according to one or more examples.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example electric vehicles and that, in other examples, aspects described herein apply to other types of electric vehicles.

As described herein, the environment 100 includes a network service that receives information from the electric scooter 110 and/or the electric bicycle 130 (also referred to herein as electric vehicles) over a network communication channel (e.g., one or more networks, the Internet, etc.). The information enables a user, using a client application executing on a computing device, to locate, request, and/or reserve (e.g., rent or borrow for a duration of time) one or more electric vehicles.

In some examples, the network service includes one or more computing systems or servers that are remote from the computing device of the user and the electric vehicles. The one or more computing systems includes an application programming interface (API) that enables the one or more computing systems to receive information from, send information to, and otherwise interact with the computing device, the electric vehicles 110, 130 and/or the rechargeable battery kiosk(s) 150.

For example, the client application executing on the computing device of the user receives, from the network service over the network communication channel, information about a location of one or more of the electric vehicles. The location of each of the electric vehicles can then be provided on a user interface of the client application.

In one example, the user interface of the client application includes a map that displays a determined location of the user and/or a determined location of the electric vehicles. In some examples, the determined location of the user and/or the determined location of the electric vehicles is based, at least in part, on Global Positioning System (GPS) data (or other location information) received by the network service over the network communication channel.

The user interface of the client application displays the location information of the user and the electric vehicles as different icons (or other such representations). Once the location information is displayed, the user may select an icon representing a type of electric vehicle (e.g., an icon for an electric scooter 110 or an icon for an electric bicycle 130). The user interface of the client application then generates or determines a route (e.g., provides directions) from the user's current location to the selected electric vehicle. Selection of one of the icons may also enable the user to reserve (e.g., place a hold on) the electric vehicle (to ensure that the electric vehicle will be at the determined location when the user arrives), rent the electric vehicle and/or borrow the electric vehicle for a period of time.

Each electric vehicle and/or the network service also includes a location tracking system that tracks, receives and/or determines a location of each electric vehicle as they are used. In some examples, the location tracking system tracks the location information of the electric vehicle in real-time or substantially real-time. In other examples, the location tracking system determines the location information of the electric vehicle at periodic intervals (e.g., every minute, every 5 minutes, every 10 minutes, etc.). In yet other examples, the location tracking system may track the location of the electric vehicle in real-time or substantially real-time when the electric vehicle is rented or otherwise used by a user and may track location information at periodic intervals when the electric vehicle has been reserved or is otherwise not is use.

The one or more computing systems of the network service also include one or more databases that store information about each of the electric vehicles and/or the rechargeable battery kiosk(s) 150. For example, the one or more databases may store location information for each electric vehicle and/or the rechargeable battery kiosk(s) 150, rechargeable battery status information for rechargeable batteries used by each electric vehicle and/or in the rechargeable battery kiosk(s) 150, rechargeable battery kiosk information (e.g., the number of rechargeable batteries housed by the rechargeable battery kiosk 150), and/or electric vehicle status information (e.g., how many times the electric vehicle has been used, whether the electric vehicle is damaged, whether the electric vehicle should be serviced etc.).

The one or more databases may also store information about the user. This information may include a profile of the user (e.g., username, contact information, etc.) security credentials of the user (e.g., a password), historical usage data, payment information and the like.

The one or more computing systems of the network service may also include a matching system. The matching system receives, manages or otherwise handles various requests from the user. The requests may include electric vehicle rental requests and electric vehicle reservation requests. For example, when a vehicle rental request is received from the client application executing on the user's computing device, the matching system may communicate with the location tracking system and determine which electric vehicle should be matched with or otherwise assigned to the requesting user.

The one or more computing systems of the network service may also include a payment system that processes payment information of the user. For example, when a user rents and uses an electric vehicle, the user may be charged for the usage based on a duration of use and/or a travel distance. Once the user has finished using the electric vehicle (e.g., by arriving at their intended destination, a check-in point, a rechargeable battery kiosk 150, etc.), the payment system may automatically process the payment information of the user.

As discussed above, the environment 100 includes one or more electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gears, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the user and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual user may operate an electric vehicle for a period of time and then determine that the rechargeable battery in use by the electric vehicle needs to be recharged. In some instances, the electric vehicle, or the rechargeable battery itself, may communicate current battery charge information for the rechargeable battery to the computing device of the user. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the user. When this occurs, the user may be directed to a rechargeable battery kiosk 150. For example, the network service can transmit data, over one or more networks, to the computing device to cause the computing device to display information about a particular rechargeable battery kiosk 150 to travel to.

When the user arrives at the rechargeable battery kiosk 150, the user may exchange the electric vehicle's current battery with another rechargeable battery housed by the rechargeable battery kiosk 150, thereby enabling the electric vehicle to continue or resume operation. In some instances, the user can use the client application executing on the computing device of the user to locate and/or select a rechargeable battery kiosk 150, receive directions to the rechargeable battery kiosk 150, and initiate a battery swap with the rechargeable battery kiosk 150 when the user arrives at its location.

According to examples, when a battery swap is initiated, the control system of the electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when a user is traveling through the geographic region on an electric vehicle and wants or needs to exchange the electric vehicle's current rechargeable battery for one that has more charge, the user may be directed (e.g., via the client application executing on the user's computing device) to the rechargeable battery kiosk 150 associated with the geographic region. When the user arrives at the rechargeable battery kiosk 150, the user can exchange their current rechargeable battery for one that is fully charged or substantially fully charged. This enables the user to travel using an electric vehicle across distances that may otherwise not be possible using the power provided by one charge of a rechargeable battery.

In some examples, the rechargeable battery kiosk 150 comprises a control system that communicates directly or indirectly with a computing device of the user when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, conditions of the power connector terminals and/or an amount of rechargeable batteries currently available at the rechargeable battery kiosk.

Figure 2:
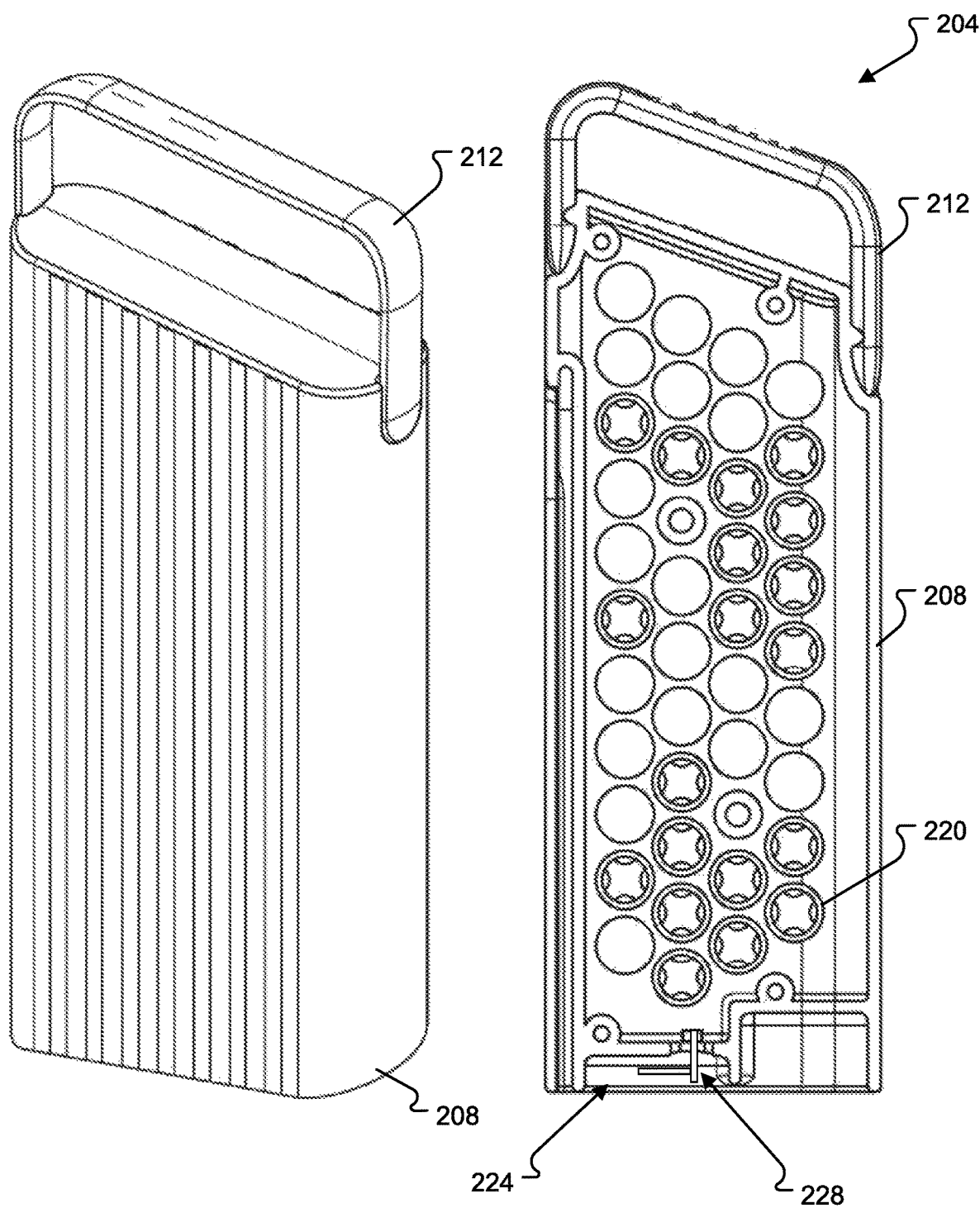
FIG. 2 illustrates an example rechargeable battery, rechargeable battery housing, and one or more components included in the rechargeable battery according to one or more examples.

FIG. 2 depicts a perspective view as well as a cross-section view of a rechargeable battery 204 according to an example. The rechargeable battery 204 may correspond to the rechargeable battery 160 as described in FIG. 1. The rechargeable battery 204 may be received in one or more of the battery holsters 120 and 140 when in use by the electric scooter 110 or the electric bicycle 130, respectively. In addition, the rechargeable battery 204 may be received at one or more battery bays of the rechargeable battery kiosk 150. The rechargeable battery 204 may include a battery housing 208 enclosing internal components of the rechargeable battery 204. For example, the battery housing 208 may enclose a plurality of battery cells 220, a battery management system, one or more rechargeable battery sensors such as one or more temperature sensors, and a battery communication system. In some examples, the rechargeable battery 204 includes a handle 212 that is removably attached to the battery housing 208. In other examples, the handle 212 is fixed to the battery housing 208 and/or forms a part of the battery housing 208. The handle 212 may assist a user when removing from or placing the rechargeable battery 204 into one or more of the battery holsters 120 and 140. Further, the handle 212 may assist a user when transporting the rechargeable battery 204. In addition, the handle 212 may assist a user when removing from or placing the rechargeable battery 204 into one or more battery bays of the rechargeable battery kiosk 150. The receiving portion 224 and power connector 228 may be used to couple the rechargeable battery 204 to charge in the rechargeable battery kiosk 150 or to use the battery in an electric vehicle having a battery holster 120 or 104.

Figure 3A:
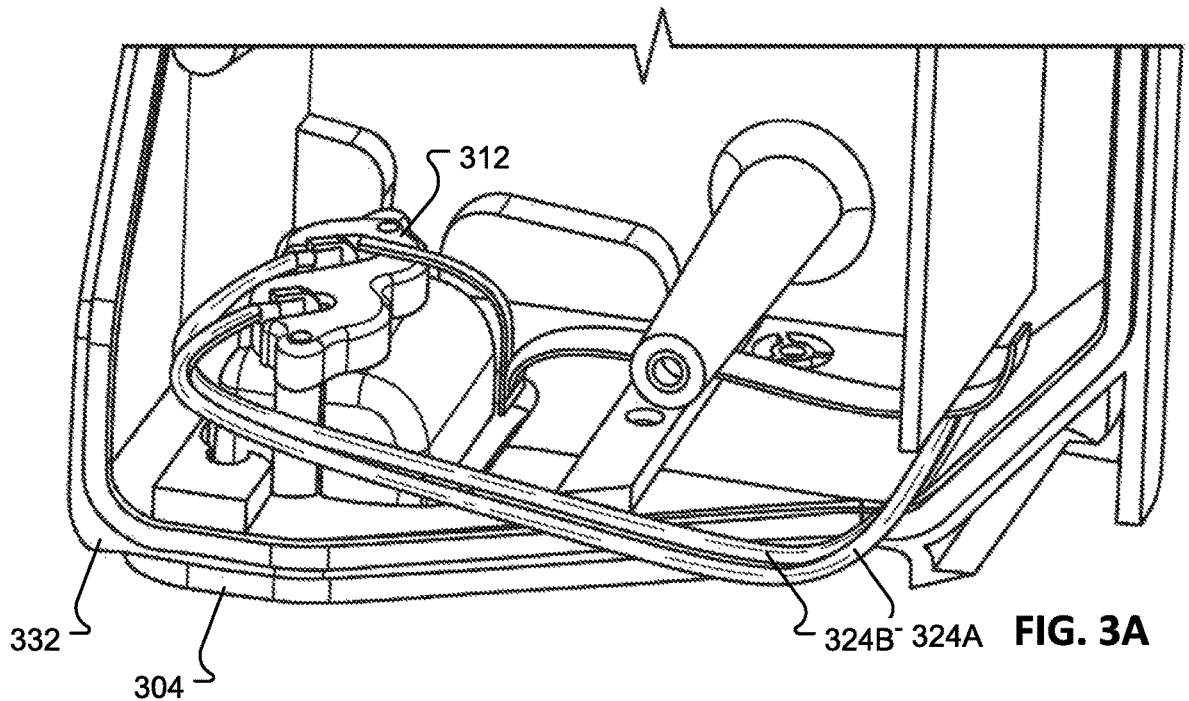
FIGS. 3A-3B illustrate additional details of one or more battery terminals of a rechargeable battery according to one or more examples.
Figure 3B:
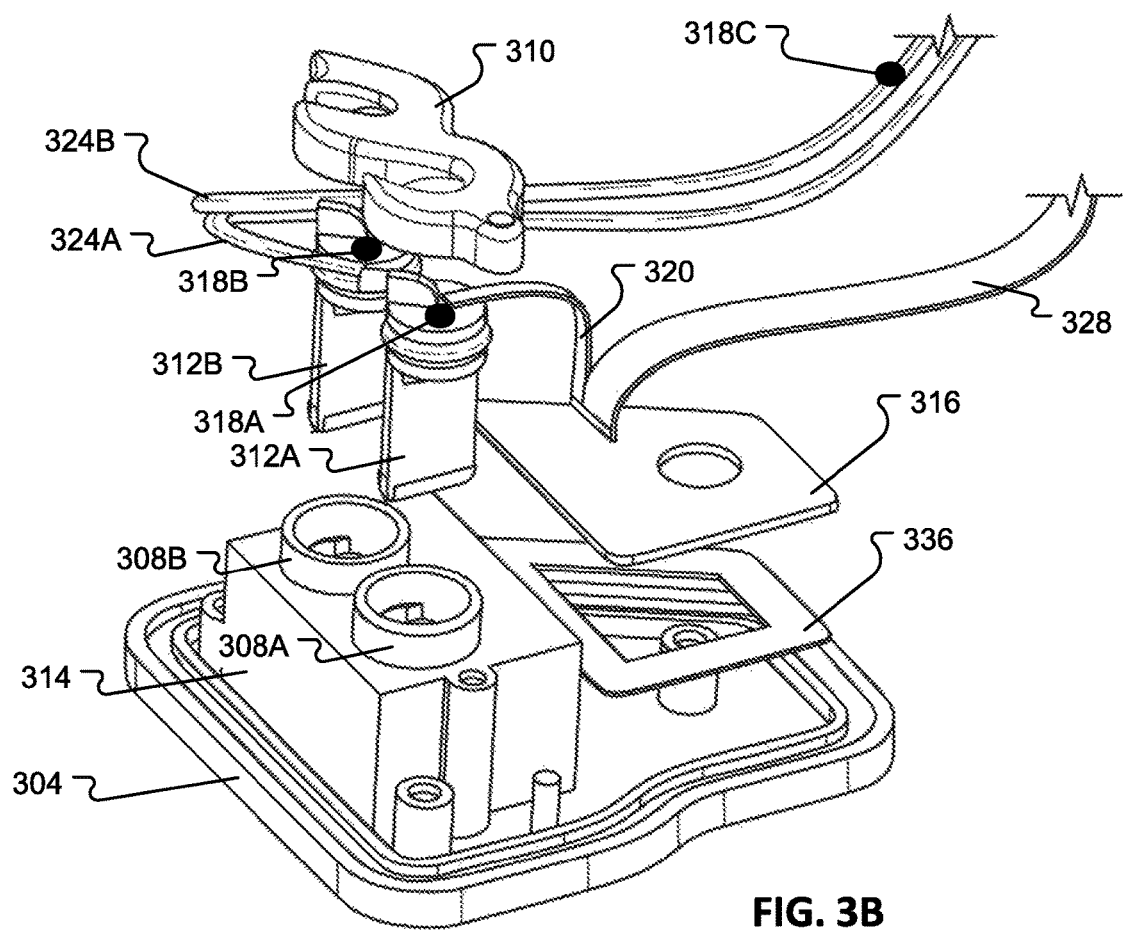

FIGS. 3A and 3B depict additional details of a connector and a communication assembly 304 of the rechargeable battery in accordance examples of the present disclosure. The connector and communication assembly 304 may include a housing 332 and a receiving portion 314 configured to receive an attachment portion of an electric vehicle or charging station. The receiving portion 314 may include a plurality of through-portions 308A and 308B disposed in a recess portion, where the through-portions 308A and 308B are configured to receive a first power connector terminal 312A or a second power connection terminal 312B; and the power connector terminals are configured to be secured to the through-portions 308A and 308B via one or more retaining clips 310. The first and second power connector terminals 312A and 312B may be coupled to corresponding contacts of an attachment portion, for example in a battery bay of a battery charging kiosk and/or of a rechargeable battery holster of an electric vehicle. The first and second power connector terminals 312A and 312B may be coupled to a circuit board, or module (referred to herein as circuit board 316) via a ribbon and/or power cable 320. Further, the power connector terminals 312A and 312B may be coupled to one or more battery cells and/or one or more components of a battery management system, via the power cables 324A and 324B. Additional details of the battery management system are provided with respect to FIG. 6.

In examples, each of the power connector terminals 312A and 312B may include a first and second temperature sensor 318A and 318B; the temperature sensors 318A and 318B may be configured to sense a temperature of a corresponding power connector terminal 312A/312B. As one example, the temperature sensors 318A and 318B may be one of a thermistor, thermocouple, resistance temperature detector (RTD), or other device that detects a temperature of the power connector terminal 312A/312B. The temperature sensors 318A and 318B may sense a temperature and provide an output voltage, current, or other signal indicative of the temperature; accordingly, the signal indicative of the temperature may be converted to a digital value utilizing an analog-to-digital converter. The analog-to-digital converter may be located at a battery management system and/or integrated into another component of the rechargeable battery. For example, the temperature sensors 318A and 318B may be coupled to an analog-to-digital converter located in the circuit board 316 via the power cable 320. The circuit board 316 may be coupled to the battery management system via the communication cable 328. In some examples, a third temperature sensor 318C may be positioned in proximity to or directly contacting one of the power cables 324B; the temperature sensor 318C may indicate a temperature of the power cable at the specific location of contact. Accordingly, a comparison between the temperature of the power cable 320 and a temperature of the power connector terminal 312B may indicate a condition of the power connector terminal 312B.

If a temperature of the first and second power connector terminal 312A/312B is greater than a threshold or otherwise varies from a temperature of a power cable 324B for instance, such temperature increase may be indicative of a fault condition occurring at the power connector terminal. For example, if the power connector terminal 312A is dirty, the power connector terminal 312A may not make a solid or otherwise good connection to an external contact of an attachment portion, such as one found in the battery holster 120 or 140 (FIG. 1) and/or a battery bay of a rechargeable battery kiosk 150. If such condition is realized, for example a sensed temperature of the power connector terminal 312A exceeds a threshold, the battery management system of the rechargeable battery may cause a communication to be sent to either a rechargeable battery kiosk 150, mobile device, or other electric vehicle. In some instances, the power connector terminal 312A may simply be dirty; in other instances, the power connector terminal 312A may be damaged. In some instances, a contact associated with an attachment portion of the electric vehicle or charging station may be dirty, damaged, or otherwise cause an increase in resistance at the power connector terminal. To remedy a dirty power connector terminal 312A for example, a user or technician may need to clean the power connector terminal 312A when the rechargeable battery is in a safe operating mode.

In some examples, the circuit board 316 may be a communications circuit board configured to communicate with an external device, such as a battery charging kiosk, an electric vehicle, or a mobile communication device. As previously discussed, the circuit board 316 may be communicatively coupled to the battery management system and/or the temperature sensors 318A and 318B. Power may be supplied to one or more components of a communication system that include the circuit board 316; the circuit board 316 may allow for any type of wireless communication from the rechargeable battery to an external device, such as an electric vehicle, a mobile device, and/or a rechargeable battery kiosk 150. An antenna 336 may reside between circuit board 316 and a surface of the connector and communication assembly 304. Communication assembly may also include a wired communication interface, such as an i2c connector, to communicate information via a wired communication interface (not illustrated) to a charger or an electric vehicle. Accordingly, rechargeable battery configuration, status, and fault information may be communicated to and from the rechargeable battery.

Figure 4:
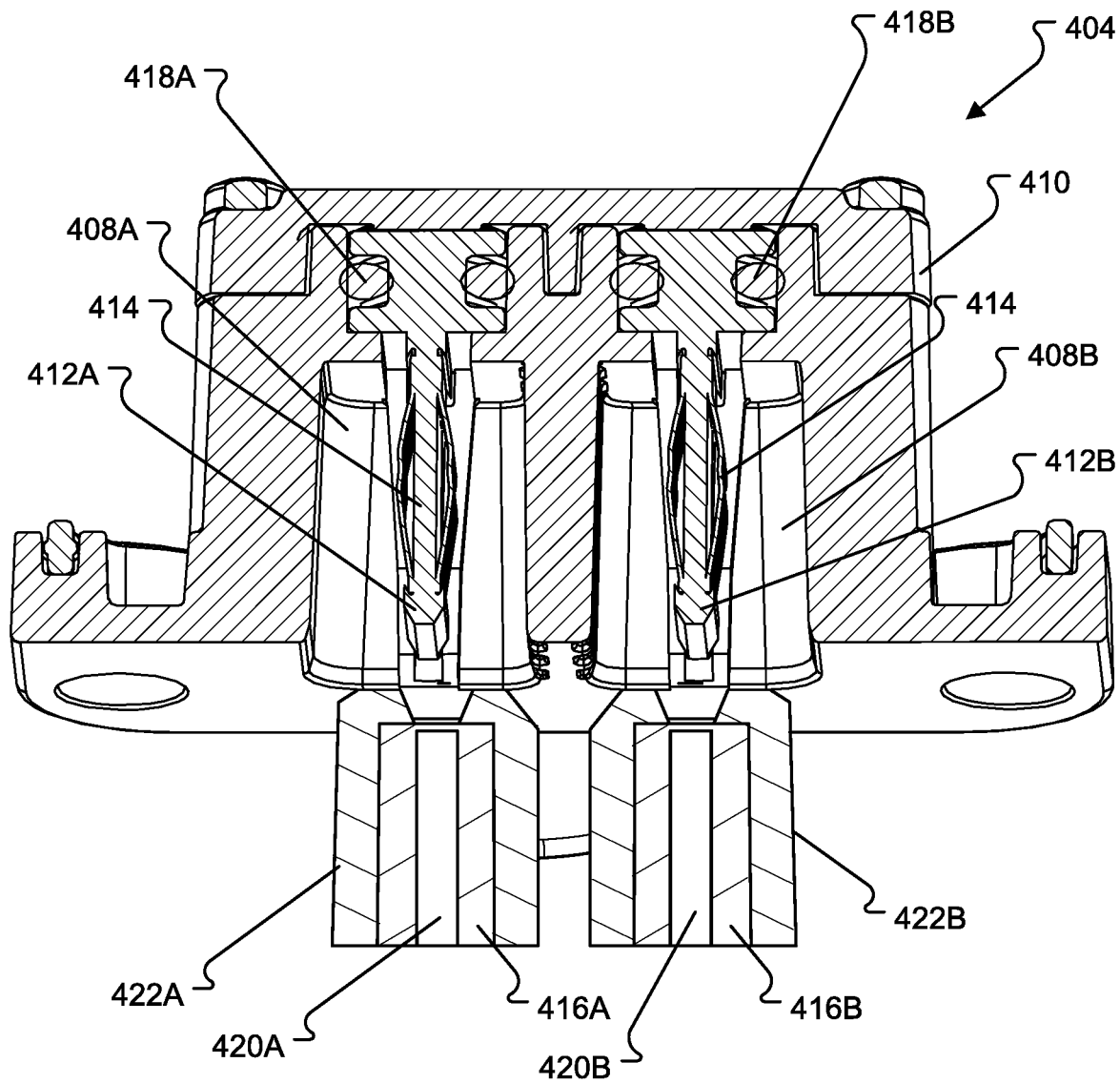
FIG. 4 illustrates additional details of one or more battery terminals of a rechargeable battery according to one or more examples.

FIG. 4 depicts additional details of an interface 404 including the power connector terminals interfacing with one or more contacts of an attachment portion of an electric vehicle and/or charging kiosk. More specifically, FIG. 4 depicts a cross-sectional view of an assembled receiving portion 314 of FIG. 3 interfacing with an attachment portion of an electric vehicle and/or charging kiosk. The power connector terminals 412A and 412B are depicted as being seated in the through-holes 408A and 408B and maintained in position by the retainer clip 410. Each of the power connector terminals 412A and 412B may be configured as a friction-type terminal, where a side of the terminal is configured to deform in a manner such that the external portions 414 maintain contact with an inner surface 416A/416B of a female receiving connector when the power connector terminal is inserted into the attachment connector 422A/422B. Stated another way, when an end portion of the power connector terminals 412A/412B are inserted into a center portion 420A/420B of the attachment connector 422, surfaces of the external portions 414 may contact the inner surfaces 416A and 416B of the attachment connector 422A/422B such that an electrical connection between the power connector terminals 412A/412B and conductive portions of the attachment connector 422A/422B are maintained.

As further illustrated in FIG. 4, temperature sensors 418A and 418B may be incorporated into or otherwise in contact with the power connector terminals 412A and 412B. More specifically, the temperature sensors 418A/418B may be located between an end portion of the power connector terminals 412A and 412B that is configured to contact the attachment connector 422A/422B and an upper portion of the power connector terminal 412A/412B disposed between an upper through-hole portion, or stop, of the through-holes 408A/408B and the retainer clip 410. Accordingly, each of the temperature sensors 418A and 418B may sense a temperature of respective power connector terminals 412A and 412B.

Figure 5A:
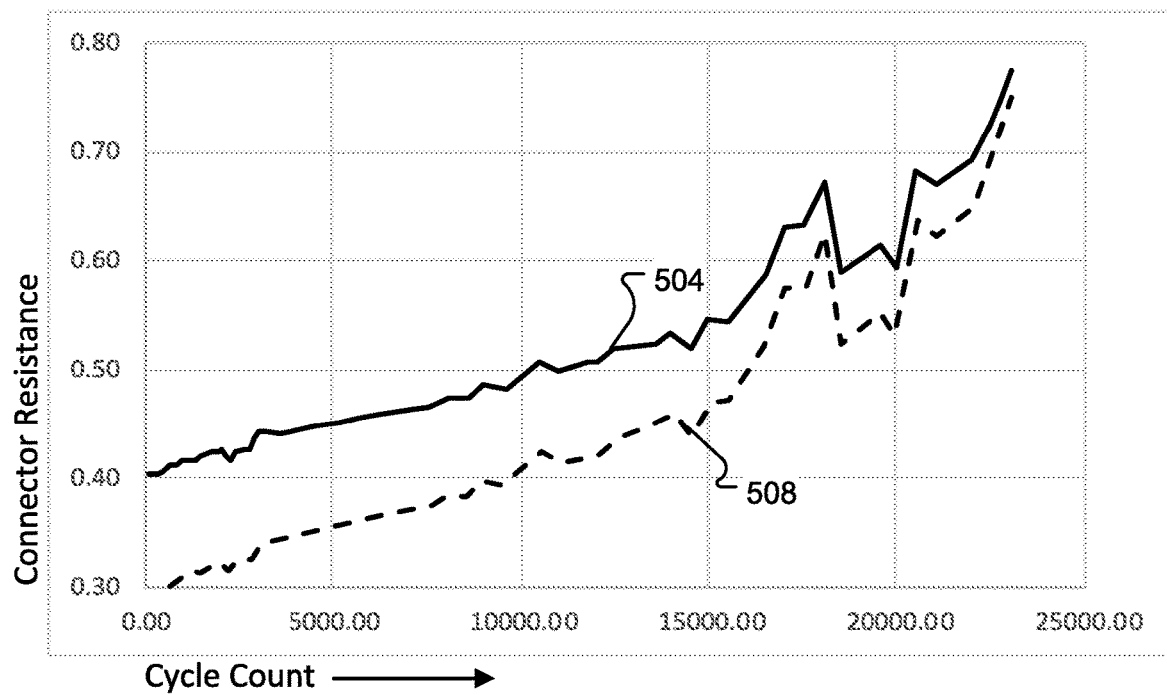
FIGS. 5A-5C depict resistances, temperatures, and temperature thresholds as measured and/or determined over rechargeable battery cycle counts according to one or more examples.

In accordance with examples of the present disclosure, each of the temperature sensors 418A and 418B provide temperature information for determining a condition of the respective power connector terminals 412A/412B. As previously discussed, oxidation of the power connector terminals 412A/412B and/or conductive surfaces 416A/416B of the attachment connector 422A/422B may cause a resistance of the respective power connector terminal to increase over time. For example, oxidation may cause a non-conductive oxide layer to build upon conductive surfaces of the power connector terminals 412A/412B and/or conductive surfaces 416A/416B of the attachment connector 422A/422B. While conduction through a thin oxidation layer may occur, such conduction may be subject to additional resistance caused by the oxidation. In some instances, for example in climates having higher amounts of precipitation, the oxidation processor may occur rather quickly. Alternatively, or in addition, in dryer climates oxidization may not occur as quickly; however, dust and other material may build upon the conductive surfaces and increase a resistance amount of the connector. Over time, and as excess heat may be produced by the increase in resistance, such heat may be measured by the temperature sensors 418A/418B and a connector resistance pattern, based on temperature detection, associated with normal use may be utilized for setting thresholds to detect connector condition anomalies. For example, an expected increase in resistance may be similar to or the same as that which is illustrated in FIG. 5A. That is, as a number of cycle uses (e.g., a cycle including, but not limited to: discharging the rechargeable battery, removing the rechargeable battery from the battery holster, placing the rechargeable battery into the battery charging kiosk, removing the rechargeable battery from battery charging kiosk, and placing the rechargeable battery into the battery holster) increases over time, a connector resistance 504 and/or a corresponding percent increase in connector resistance may be plotted over time. Accordingly, for an expected cycle count, for example, 10,000 cycles, a corresponding increase of 0.10 ohms may be expected.

Figure 5B:
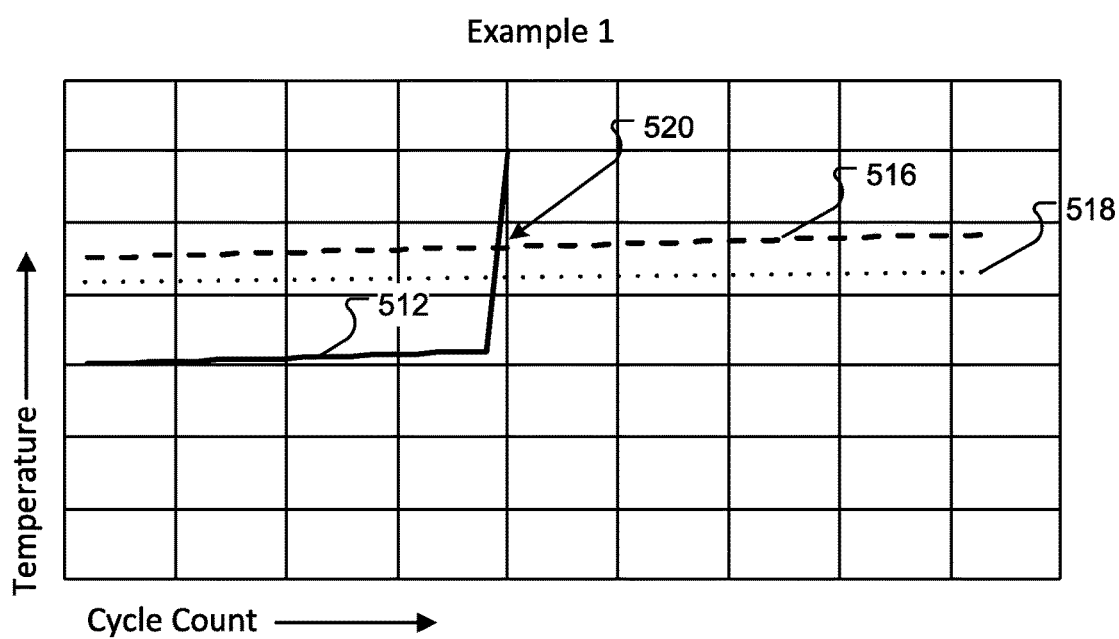

As depicted in FIG. 5B, a temperature 512 corresponding to a temperature indication provided by a temperature sensor 418A/B for example, may be plotted over time; similar to an expected increase in connector resistance, an increase in temperature may be detected as a cycle count increases. Moreover, a first temperature threshold 516 may be established providing an upper limit to a temperature range that may be indicative of a safe operation of the rechargeable battery and/or power connector terminal. The first temperature threshold 516 may be specific to a single rechargeable battery and/or may be specific to a group of rechargeable batteries. Moreover, the first temperature threshold 516 may be established based on a location of the rechargeable battery or the group or rechargeable batteries. For example, a first temperature threshold 516 may be established for a group of rechargeable batteries located in a climate or region having higher oxidization rates while a second temperature threshold 518 may be established for a group of rechargeable batteries located in a climate or region having lower oxidization rates but higher rates of dust or sand particulates in the air. As further depicted in FIG. 5B, a detected temperature 512 may exceed the first temperature threshold 516 and/or the second temperature threshold 518 at 520. Embodiments of temperature thresholds may depend on characteristics of particular battery compositions, but may range from about 45° C.-50° C., though the particular temperature thresholds may depend on many variables, including the local oxidation rate, battery chemistry, or number of charge cycles the battery performed. Accordingly, when one of the temperature thresholds is exceeded, the battery management system of the rechargeable battery may reduce an amount of current incoming or outgoing in a respective use or charge application by, for example, controlling the voltage or current applied to the gate or base of a transistor, such as a bipolar power transistor, bipolar junction transistor, a thyristor, Alternatively or in addition, the battery management system may provide an indication to a backend system that a condition of the rechargeable battery connector may be in a degraded condition.

Figure 5C:
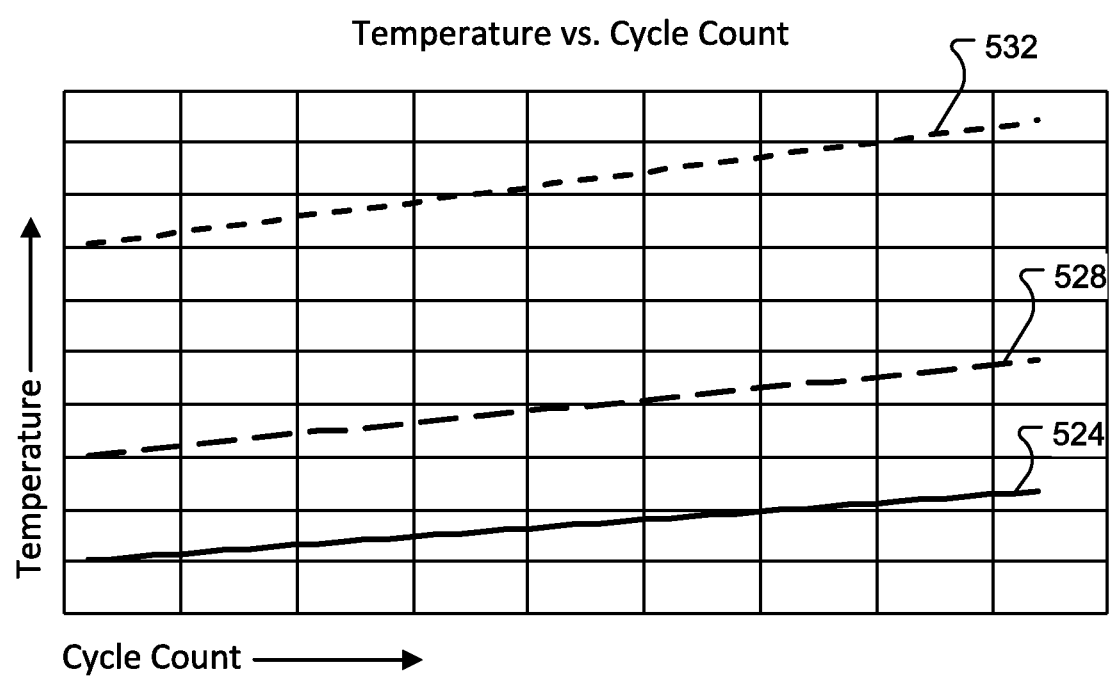

FIG. 5C depicts another example of a temperature vs. cycle count graph in accordance with examples of the present disclosure. More specifically, a detected temperature 524 corresponding to a temperature indication provided by a temperature sensor 418A/B for example, may be plotted over time. One or more temperature thresholds 528 and/or 532 may be plotted or otherwise included. In a first example, the first temperature threshold 528 may correspond to a temperature threshold specific to an incidence of damage inflicted on the rechargeable battery connector while the second temperate threshold 532 may correspond to an increase in connector resistance due to normal wear and tear. Damage inflicted on the rechargeable battery may be determined, in part, based on other rechargeable battery sensors, such as an accelerometer sensor.

Figure 6:
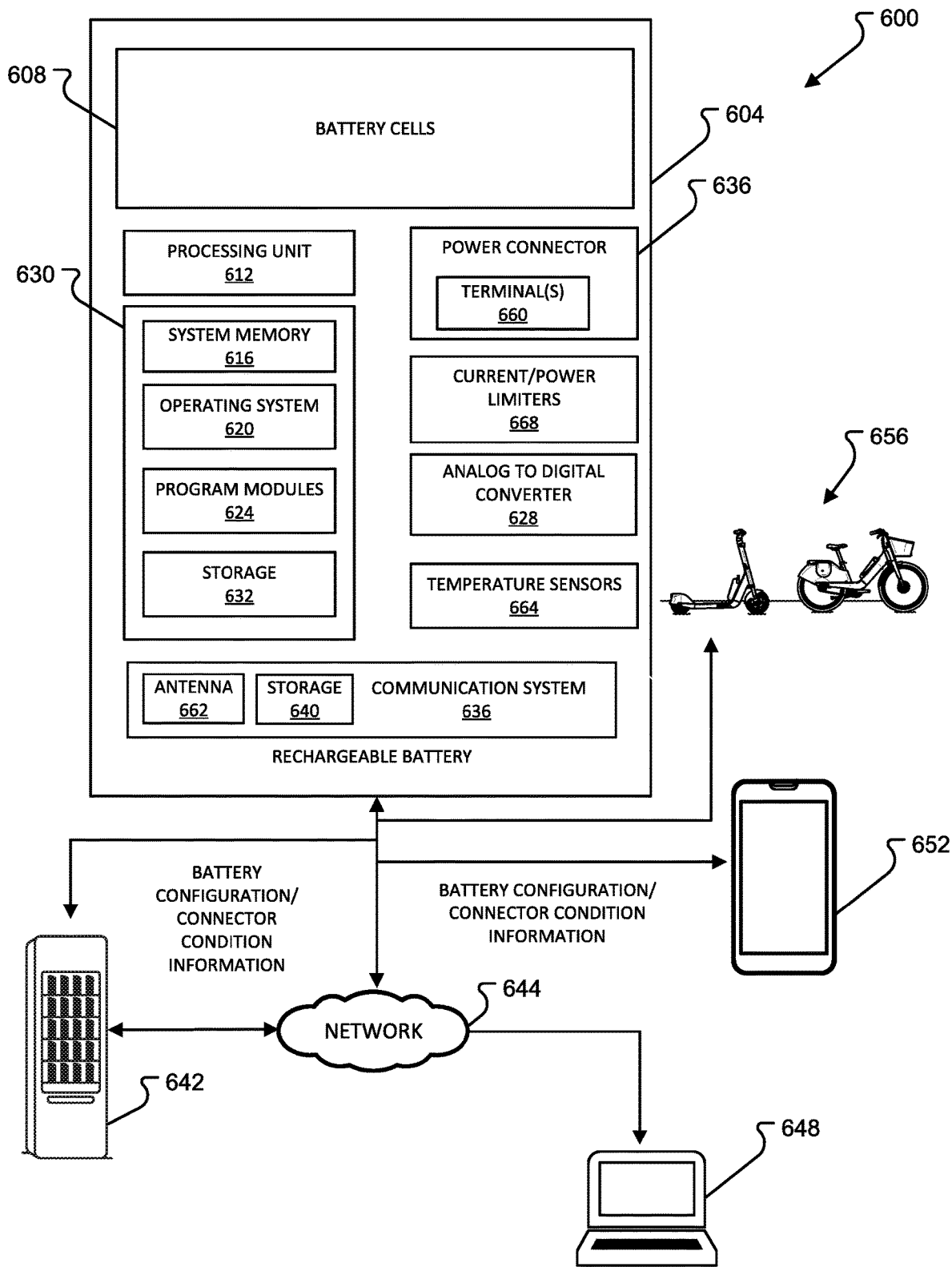
FIG. 6 illustrates a block diagram of one or more components included within a rechargeable battery according to one or more examples.

FIG. 6 is a system diagram 600 of a rechargeable battery 604 according to one or more examples. In some examples, the rechargeable battery 604 can correspond to the rechargeable battery 160 shown and described with respect to FIG. 1. The rechargeable battery 604 may include a plurality of battery cells 608 and may further include at least one processing unit 612 and a system memory 616. The system memory 616 may include, but is not limited to, volatile storage (e.g., random access memory), non-volatile storage (e.g., read-only memory), flash memory, or any combination of such memories. The system memory 616 may also include an operating system 620 that controls the operation of the rechargeable battery 604 and one or more program modules 624. The program modules may be responsible for implementing one or more temperature sensor profiles and cause one or more temperature readings to be obtained and/or recorded. In some instances, the system memory 616 may include additional storage location 632 that stores sensor information such as temperature information, location information, communication information, and/or other information directed to the rechargeable battery 604 operation and/or configuration. The processing unit 612 and the system memory 616 may form a portion of the previously described battery monitoring system. While executing on the processing unit 612, the program modules 624 may perform the various processes described above. A battery management system 630 may include, but is not limited to, the processing unit 612, the system memory 616, the operating system 620, the program modules 624, and/or the storage location 632.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the rechargeable battery 604 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The rechargeable battery 604 may include one or more communication systems 636 that enable the rechargeable battery 604 to communicate with one or more battery charging kiosks 642, networks 644, computing device 648, mobile device 652, and/or electric vehicle 656. Examples of communication systems 636 include, but are not limited to, near frequency communication (NFC) transmitter, receiver, and/or transceiver circuitry; radio frequency (RF) transmitter, receiver, and/or transceiver circuitry; cellular transmitter, receiver, and/or transceiver circuitry, and Bluetooth™ transmitter, receiver, and/or transceiver circuitry, and may include an antenna 662.

The communication system 636 may also include storage area 640, separate and distinct from the system memory 616. Such storage may facilitate the exchange of rechargeable battery fault information; that is, in instances where the rechargeable battery may be rendered inoperable, the communication system 636 may operate in a passive mode such that fault information or other status information located in the storage area 640 may be provided to a technician via a power harvested from the antenna 662 for example.

The rechargeable battery 604 may include one or more location sensors, such as global position systems (GPS), accelerometer, beacon location service, or other location sensor to obtain location information of the rechargeable battery 604. Moreover, the communication system 636 may provide the location information to one or more of the battery charging kiosks 642, computing device 648, and mobile device 652 via a cellular connection for example. The location information may allow a technician or other individual to locate the rechargeable battery 604 in instances when the rechargeable battery 604 is not in the presence of an electric vehicle or battery charging kiosk 642.

As previously discussed, the rechargeable battery 604 may include one or more power connectors 312 including terminals 660. A temperature sensor 664 may be associated with each of the terminals 660. The temperature sensor 664 may be same as or similar to the temperature sensors 318A/318B and/or 418A/418B previously discussed. In examples, the temperature sensor 664 may be coupled to an analog to digital converter, such as the analog to digital converter 628. The analog to digital converter 628 may convert an indication of temperature provided by one or more temperature sensors 664 into a digital value representative of temperature. In some examples, the analog to digital converter 628 resides or is otherwise located at the battery management system; in some examples, the analog to digital converter 628 is a separate circuit board; in some examples, the analog to digital converter 628 resides or is otherwise located at the communication system 636.

In some examples, a temperature indication from one or more of the temperature sensors 664 may be utilized to determine if a temperature associated with one or more terminals 660 of the rechargeable battery 604 has exceeded a temperature threshold, and if so, cause one or more of the current/power limiters 668 to either limit an amount of current/power that the rechargeable battery 604 receives or provides. As previously discussed, the temperature threshold may be configured based on a location of the rechargeable battery, a climate in which the rechargeable battery is located, and/or an amount of times the rechargeable battery has been charged and/or recharged. In some examples, the threshold may be determined via one or more machine learning algorithms that takes into consideration a location of the rechargeable battery, a climate in which the rechargeable battery is located, and/or an amount of times the rechargeable battery has been charged and/or recharged, or a group of rechargeable batteries having similar locations, climates, and/or cycle counts. Further, the temperature threshold may change over time as the number of cycle counts increases.

As previously discussed, the one or more of the temperature sensors 664 may reside in proximity to a power cable 324A or 324B. For example, a temperature sensor 664 may be the same as or similar to temperature sensor 318C as previously discussed. Accordingly, temperature sensor 664 may provide a temperature indication received by the battery management system such that a comparison between a temperature indication provided by a temperature sensor 664 located in proximity or directly contacting a power cable 324 may be compared to a temperature indication provided by a temperature sensor 664 in proximity or otherwise contacting a terminal 660. By making such a comparison, a distinction between a temperature of the power connector terminal and one or more other locations within the rechargeable battery housing can be made.

Figure 7:
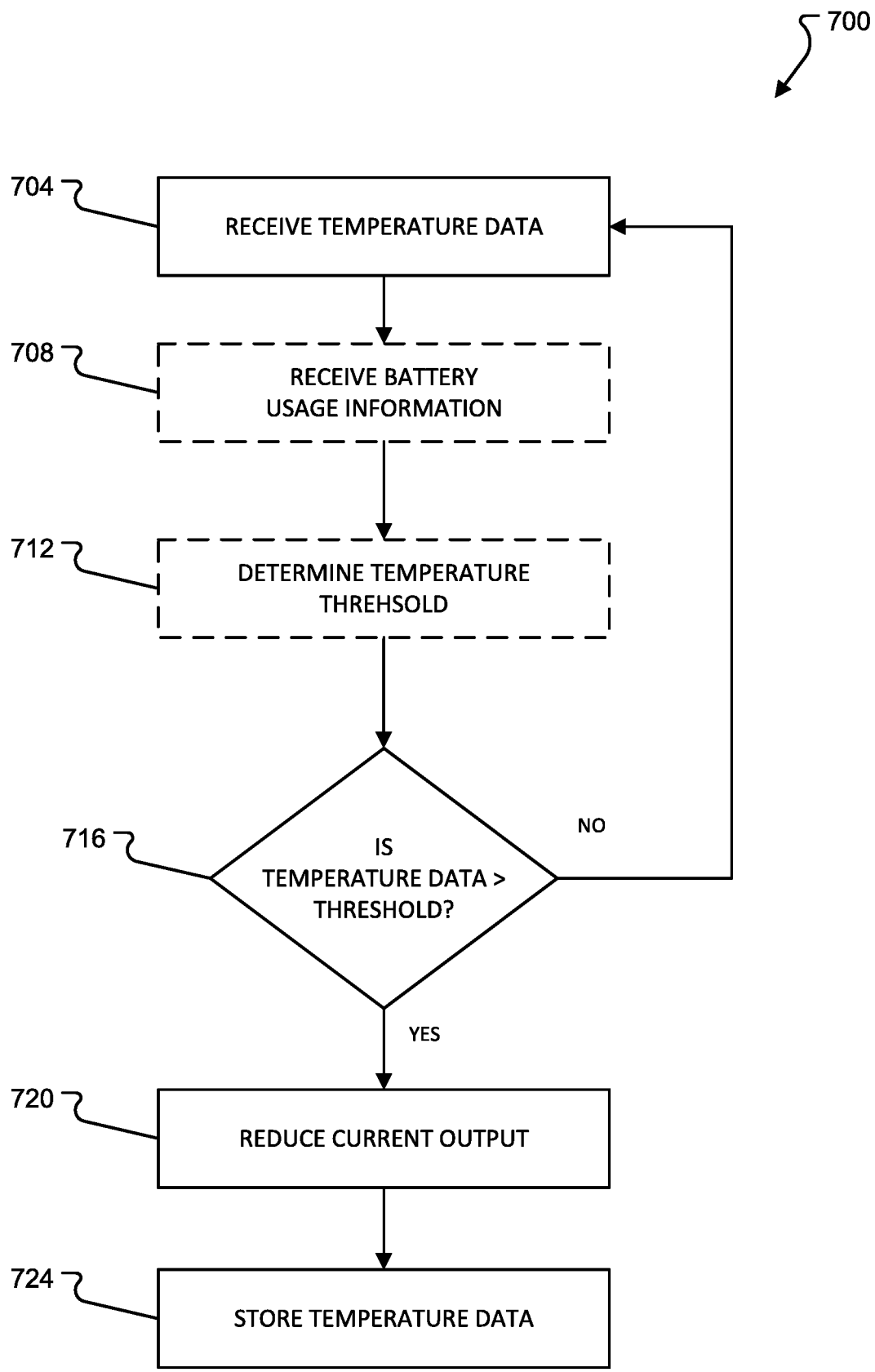
FIG. 7 illustrates a method for determining a temperature-based condition of a power connector terminal of a rechargeable battery according to one or more examples.

FIG. 7 illustrates a method 700 for reducing an amount of current/power provided by or received by the rechargeable battery 604 based on a temperature of one or more power connector terminals. The method 700 may be performed by the rechargeable battery 604, a computing device of a user, and/or a network service such as described herein. A general order for the operations of the method 700 is shown in FIG. 7. The method 700 can include more or fewer steps or can be arranged in an order of steps differently than those shown in FIG. 7. The method 700 can be executed as a set of computer-executable instructions executed by a processor and memory and/or otherwise be encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, etc. described in conjunction with FIGS. 1-6.

The method 700 may continuously flow in a loop, flow according to a timed event, or flow according to a change in an operating or status parameter. Method 700 begins when temperature data from one or more temperature sensors associated with a power connector terminal of the rechargeable battery is received step 704. For example, one or more temperature sensors 664 may provide a temperature indication corresponding to a temperature of the power connector terminal, such as a terminal 660. In some examples, the temperature indication may be received at an analog to digital converter 628 as a signal, and then converted to a digital value and provided to the processing unit 612; alternatively, or in addition, the temperate sensor data may be communicated to an entity external from the rechargeable battery via the communication system 636 and/or a communication network 644 for further processing and analysis (e.g., the network service). The temperature data may be a raw measurement of temperature associated with one or more terminals of the rechargeable battery.

In some examples, battery usage information step 708 may be received; in some instances, the battery usage information may correspond to an amount of charge cycles, an amount of discharge or use cycles, and combinations thereof. Alternatively, or in addition, the battery usage information may also correspond to accelerometer data indicating whether damage events or otherwise high impact events may have occurred or otherwise impacted the rechargeable battery and therefore potentially the power connector terminal of the rechargeable battery. In some instances, based on the received battery usage information step 708, a temperature threshold may be determined step 712. The temperature threshold may be specific to the specific power connector terminal associated with the temperature data received at step 704. In some instances, the determination of the temperature threshold may occur outside of the battery housing, for example at a computing device 648 and/or one or more processing entities associated with the network 644.

The received temperature data step 704 may be compared step 716 to the threshold determined and/or received at step 712. If the temperature data is greater than the temperature threshold, then the method 700 may proceed to step 720 where an output or input associated with the rechargeable battery may be reduced. For example, one or more of the current/power limiters 668 may reduce an amount of current/power provided to the electric vehicle 656. Alternatively, or in addition, one or more of the current/power limiters 668 may reduce an amount of current/power received from a battery charging kiosk 642 for example. The amount of reduced current/power may depend on characteristics of the system. For example, a system may be charged using 4 amps, but when the temperature exceeds a threshold, then the current may be reduced to 1 amp. The amount of temperature reduction may depend on the number of power cycles. For example, battery that has been charged for fewer cycles, e.g., 200, then the current may drop less than that of a battery having been charged for more cycles, e.g., 200. Alternatively, the amount of current/power reduction may be a more linear function of the number of charge cycles, such that the amount of current reduction is directly proportional to the number of charging cycles recorded by the battery management system.

The method 700 may then store step 724 the received temperature data and/or determined temperature threshold in a storage location 632 and/or 640 for example. Alternatively, or in addition, the rechargeable battery may communicate the received temperature data and/or determined temperature threshold to an external device, such as the computing device 648 and/or one or more processing entities associated with the network 644. In instances where the received temperature data is less than the temperature threshold step 716, the method 700 may proceed back to step 704. In some instances the received temperature data and/or determined temperature threshold may be stored in a storage location 632 and/or 640 and/or communicated to an external device, such as the computing device 648 and/or one or more processing entities associated with the network 644.

Figure 8:
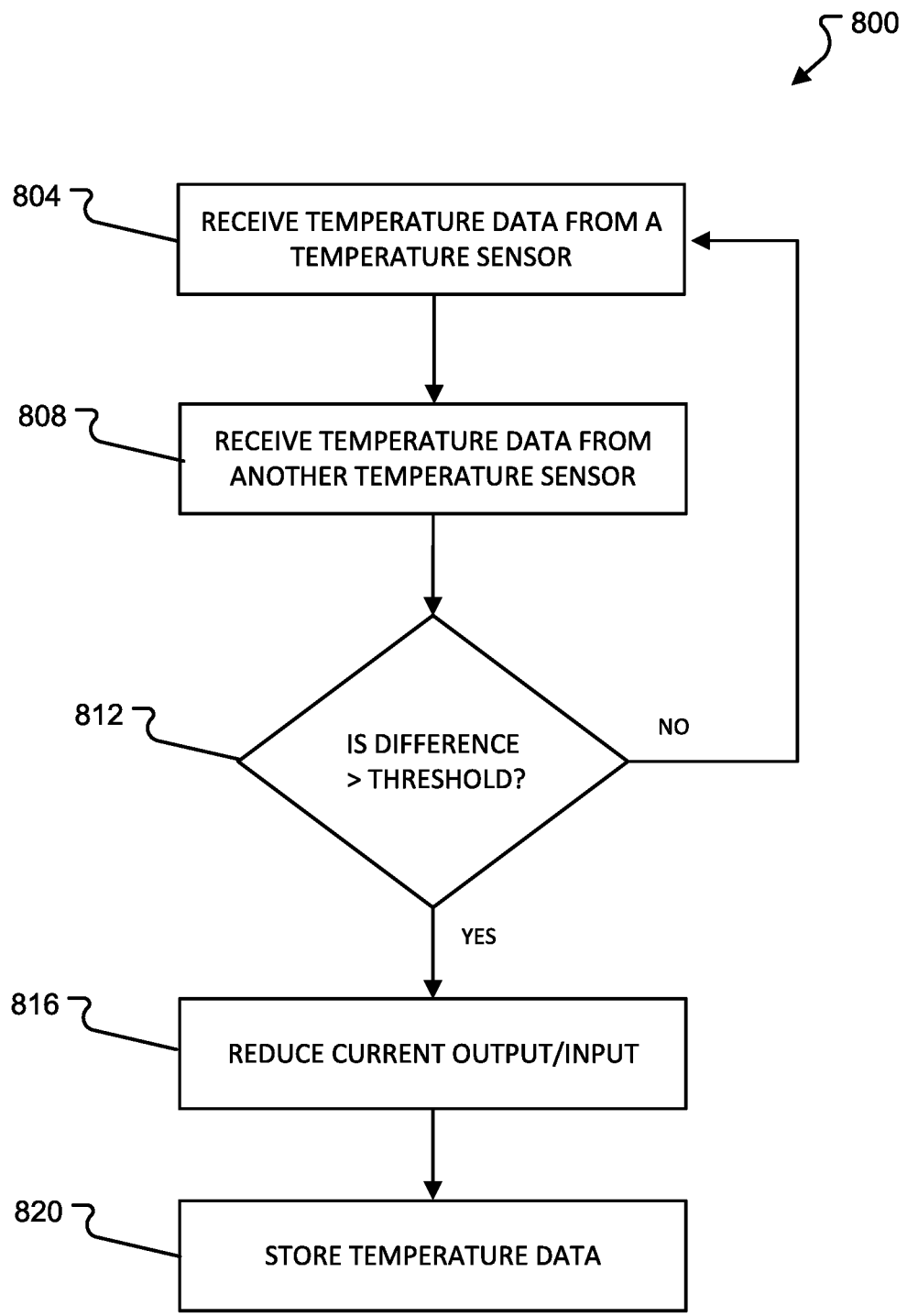
FIG. 8 illustrates a method for determining a temperature-based condition of a power connector terminal of a rechargeable battery with respect to another temperature sensing device of the rechargeable battery according to one or more examples.

FIG. 8 illustrates a method 800 for reducing an amount of current/power provided by or received by the rechargeable battery 604 based on a temperature of two or more temperature sensors, such as temperatures associated with each power connector terminal or a temperature associated with a single power connector terminal and a temperature associated with a power cable. The method 800 may be performed by the rechargeable battery 604, a computing device of a user, and/or a network service such as described herein. A general order for the operations of the method 800 is shown in FIG. 8. The method 800 can include more or fewer steps or can be arranged in an order of steps differently than those shown in FIG. 8. The method 800 can be executed as a set of computer-executable instructions executed by a processor and memory and/or otherwise be encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, etc. described in conjunction with FIGS. 1-7.

The method 800 may continuously flow in a loop, flow according to a timed event, or flow according to a change in an operating or status parameter. Method 800 begins when temperature data from one or more temperature sensors associated with a power connector terminal of the rechargeable battery is received step 804. For example, one or more temperature sensors 664 may provide a temperature indication corresponding to a temperature of the power connector terminal, such as a terminal 660. In some examples, the temperature indication may be received at an analog to digital converter 628 as a signal, and then converted to a digital value and provided to the processing unit 612; alternatively, or in addition, the temperate sensor data may be communicated to an entity external from the rechargeable battery via the communication system 636 and/or a communication network 644 for further processing and analysis (e.g., the network service). The temperature data may be a raw measurement of temperature associated with one or more terminals of the rechargeable battery.

At step 808 temperature data from another temperature sensor may be received by the battery management system. The temperature form the another temperature sensor may be another power connector terminal of the rechargeable battery and/or a temperature sensor associated with a power cable. For example, another temperature sensor 664 may provide a temperature indication corresponding to a temperature of another power connector terminal, such as a terminal 660. Alternatively, or in addition, another temperature sensor 664 may provide a temperature indication corresponding to a temperature of a power cable, such as power cable 324, within the housing. The another temperature indication may be received at an analog to digital converter 628 as a signal, and then converted to a digital value and provided to the processing unit 612; alternatively, or in addition, the another temperate sensor data may be communicated to an entity external from the rechargeable battery via the communication system 636 and/or a communication network 644 for further processing and analysis (e.g., the network service). The another temperature data may be a raw measurement of temperature associated with one or more terminals and/or one or more power cables of the rechargeable battery.

At step 812, the battery management system can determine a difference between two of the temperature indications. If the difference is less than a predetermined threshold, then the method can return to step 804. If the difference is greater than the predetermined threshold, then the method at step 816 can reduce the current output or input through one or more of the power terminals. The difference threshold again depends on the particular system characteristics and which two temperature sensors are being compared. For example, if the temperature at the power connector terminal is more than 5° C. than the temperature of the power cable, then the battery management system may reduce the current provided at the connector. Embodiments may also be able to compare the rate of change in temperature at one sensor. An indication that the temperature is increasing too rapidly may indicate a short circuit or other problem. Therefore, if the difference in temperature at one sensor changes too much between two samples, then current may be further reduced or turned off entirely. For example, if the temperature increases 5° C. within 3 seconds, then the current may be shut off. However, if the temperature increases 5° C. within 1 minute, then the system may reduce the current by a predetermined percentage, e.g., 25%. Then, in step 820, the received temperature data (step 808) may be stored in a storage location 632 and/or 640 for example. Alternatively, or in addition, the rechargeable battery may communicate the received temperature data to an external device, such as the battery charging kiosk 642, the computing device 648, and/or one or more processing entities associated with the network 644.

Figure 9:
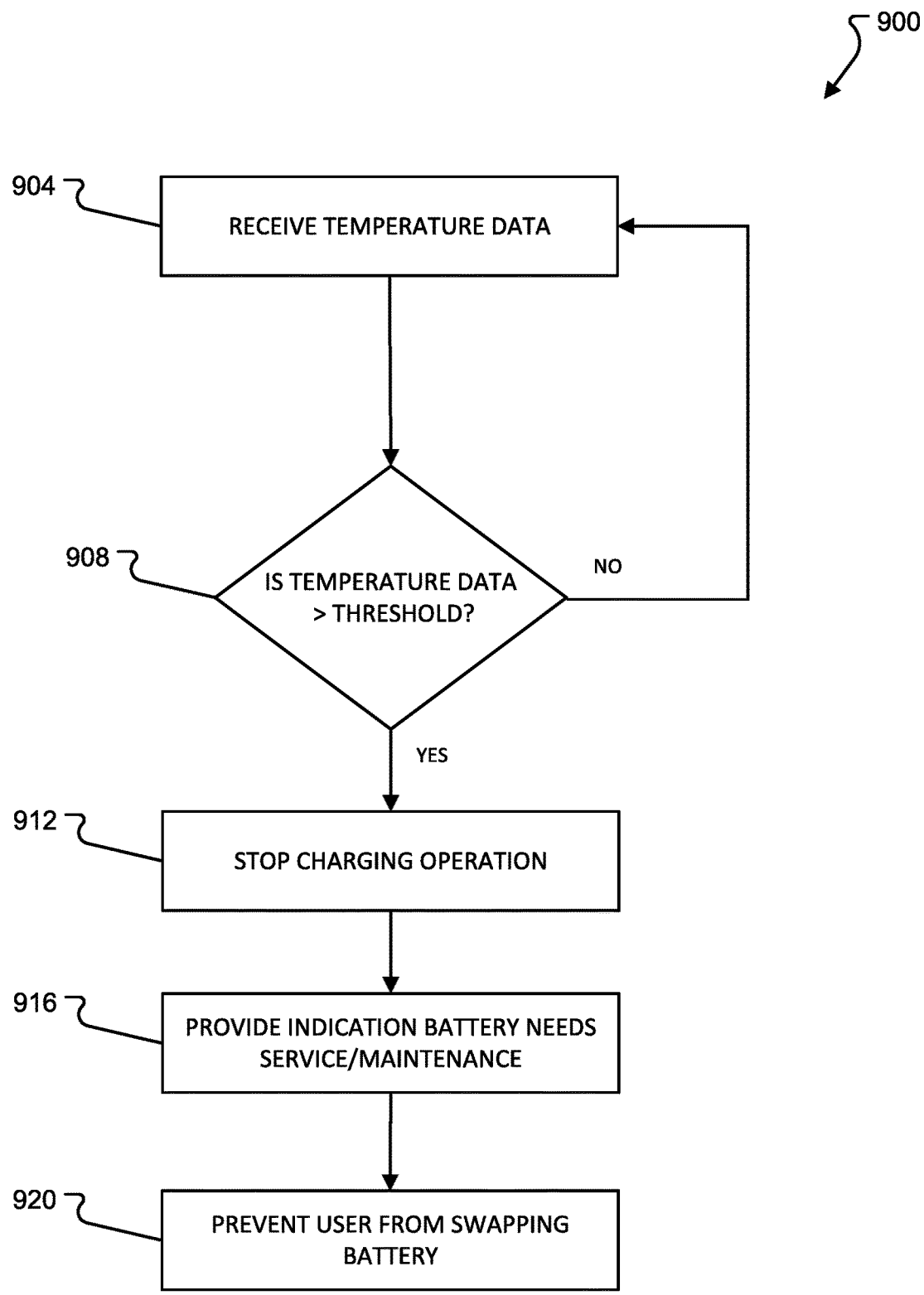
FIG. 9 illustrates a method for determining a temperature-based condition of a power connector terminal of a rechargeable battery and further preventing a charging operation according to one or more examples.

FIG. 9 illustrates a method 900 for interrupting a charging operation based on a temperature of one or more power connector terminals. The method 900 may be performed by the rechargeable battery 604, a computing device of a user, the battery charging kiosk 642 and/or a network service such as described herein. A general order for the operations of the method 900 is shown in FIG. 9. The method 900 can include more or fewer steps or can be arranged in an order of steps differently than those shown in FIG. 9. The method 900 can be executed as a set of computer-executable instructions executed by a processor and memory and/or otherwise be encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, etc. described in conjunction with FIGS. 1-8.

The method 900 may continuously flow in a loop, flow according to a timed event, or flow according to a change in an operating or status parameter. Method 900 begins when temperature data from one or more temperature sensors associated with a power connector terminal of the rechargeable battery is received step 904. For example, one or more temperature sensors 664 may provide a temperature indication corresponding to a temperature of the power connector terminal, such as a terminal 660. In some examples, the temperature indication may be received at an analog to digital converter 628 as a signal, and then converted to a digital value and provided to the processing unit 612; alternatively, or in addition, the temperate sensor data may be communicated to an entity external from the rechargeable battery via the communication system 636 and/or a communication network 644 for further processing and analysis (e.g., the network service). The temperature data may be a raw measurement of temperature associated with one or more terminals of the rechargeable battery.

In some examples, a temperature threshold may be determined and/or received in a manner similar to that described with respect to step 712. The temperature threshold may be specific to the specific power connector terminal associated with the temperature data received at step 904. In some instances, the determination of the temperature threshold may occur outside of the battery housing, for example at the battery charging kiosk 642, a computing device 648, and/or one or more processing entities associated with the network 644.

The received temperature data (step 904) may be compared step 908 to the temperature threshold. If the temperature data (step 904) is greater than the temperature threshold, then the method 900 may proceed to step 912 where a charging operation may be stopped or otherwise interrupted. Moreover, at step 916 the rechargeable battery 604 and/or the battery charging kiosk 642 may provide an indication, set a status flag, or otherwise make a maintenance team aware that the specific rechargeable battery needs to be serviced and/or maintained. For example, a service technician may need to clean and/or replace one or more power connector terminals of the rechargeable battery 604. At 920, the battery charging kiosk 642 may further prevent a user from utilizing or otherwise swapping a battery needing charge with the battery needing maintenance bay locking or otherwise not making available the rechargeable battery needing charge to the user. If, at 908, the received temperature data (step 904) is less than the temperature threshold, the method 900 may proceed back to 904. In some instances, the received temperature data (step 904) may be stored in a storage location 632 and/or 640 for example. Alternatively, or in addition, the rechargeable battery may communicate the received temperature data (step 904) to an external device, such as the battery charging kiosk 642, the computing device 648, and/or one or more processing entities associated with the network 644.

FIG. 10 depicts a data structure 1000 in accordance with examples of the present disclosure. The data structure may be utilized to store temperature data, for example temperature data received from one or more previously described temperature sensors and/or a converted temperature signal, for example from an analog to digital converter, received from the one or more previously described temperature sensors. The data structure may store data at one or more of the storage areas 640 and/or storage locations 632 and/or may be communicated by the communication system 636 to one or more of the battery charging kiosk 642, a computing device 648, a mobile device 652, and/or an electric vehicle 656 via the network 644.

The data structure 1000 may store a battery identifier 1004, a temperature sensor identifier 1008, a location of the rechargeable battery 1012, a number of charge cycles 1016, discharge cycles, and/or combinations thereof 1006, and a corresponding time of temperature measurements 1020. As further depicted in FIG. 10, the data structure 1000 may include multiple battery identifiers, multiple temperature sensor identifiers, locations associated with each temperature sensor identifier, cycle counts associated with each battery identifier, and timestamps for many temperature measurements. The data structure 1000, and the data stored within the data structure 10000, may be utilized to determine a temperature threshold, for example at step 712 in method 700.

The term computer-readable media as used herein may include computer storage media. Computer storage media may include volatile and nonvolatile, removable and non-removable media implemented in any method or technology for storage of information, such as computer readable instructions, data structures, or program modules.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A rechargeable battery, comprising:
   a housing;
   a first temperature sensor within the housing to sense a first temperature of a first power connection terminal of the rechargeable battery;
   a second temperature sensor within the housing to sense a second temperature of a second power connection terminal of the rechargeable battery;
   a battery management system within the housing, the battery management system continuously measuring a temperature of the first power connection terminal and a temperature of the second power connection terminal in a loop and causing a reduction in an amount of current through at least one of the first power connection terminal or the second power connection terminal when a temperature difference between the first power connection terminal and the second power connection terminal exceeds one or more thresholds, wherein at least one of the one or more thresholds is based on a location of the rechargeable battery;
   at least one location sensor; and
   a communication system, wherein the communication system communicates location information of the rechargeable battery to one or more external devices selected from the group consisting of one or more battery charging kiosks, a network, a computing device, a mobile device, and an electric vehicle.

2. The rechargeable battery of claim 1, wherein the first power connection terminal and the second power connection terminal couple the rechargeable battery to at least one of an electric vehicle or a charging station.

3. The rechargeable battery of claim 2, wherein the first temperature sensor is in direct contact with the first power connection terminal.

4. The rechargeable battery of claim 1, wherein the rechargeable battery is configured to wirelessly communicate at least one sensed temperature of the first power connection terminal or the second power connection terminal to the one or more external devices.

5. The rechargeable battery of claim 1, wherein the battery management system receives the one or more thresholds for determining when to cause the reduction in the amount of current through at least one of the first power connection terminal or the second power connection terminal.

6. The rechargeable battery of claim 1, wherein the battery management system receives two or more thresholds for determining when to cause the reduction in the amount of current through at least one of the first power connection terminal or the second power connection terminal.

7. The rechargeable battery of claim 1, wherein the battery management system wirelessly communicates a status condition of the first power connection terminal to the one or more external devices.

8. The rechargeable battery of claim 1, further comprising a third temperature sensor communicatively coupled to the battery management system, wherein the third temperature sensor senses a temperature of at least one battery cell within the housing.

9. A method for continuously monitoring a condition of a power connection terminal of a rechargeable battery, comprising:
   receiving, at a battery management system, an indication of a first temperature associated with a first power connection terminal of a rechargeable battery;
   receiving, at the battery management system, an indication of a second temperature associated with a second power connection terminal of the rechargeable battery;
   modifying, by the battery management system, at least one operation of the rechargeable battery based, at least in part, on one or more thresholds, wherein at least one of the one or more thresholds is based on a location of the battery;
   wherein modifying the at least one operation of the rechargeable battery comprises:
      comparing the first temperature to the second temperature to determine whether a temperature difference between the first power connection terminal and the second power connection terminal exceeds the at least one of the one or more thresholds; and
      modifying the at least one operation of the rechargeable battery to reduce an amount of current through the first power connection terminal if the first temperature exceeds the second temperature by the at least one of the one or more temperature thresholds or to reduce the amount of current through the second power connection terminal if the second temperature exceeds the first temperature by the at least one of the one or more thresholds,
   wherein the method for monitoring the condition of the power connection terminal of a rechargeable battery flows continuously in a loop.

10. The method of monitoring the condition of the power connection terminal of the rechargeable battery according to claim 9, further comprising:
   receiving an indication of a third temperature associated with a power cable between the first power connection terminal and at least one battery cell of the rechargeable battery;
   comparing the first temperature to the third temperature; and
   modifying the at least one operation of the rechargeable battery if the first temperature associated with the first power connection terminal of the rechargeable battery exceeds the third temperature associated with the power cable between the first power connection terminal and the at least one battery cell of the rechargeable battery by a difference threshold.

11. The method for monitoring the condition of the power connection terminal of the rechargeable battery according to claim 9, further comprising wirelessly communicating the first temperature to a device external to the rechargeable battery.

12. The method for monitoring the condition of the power connection terminal of the rechargeable battery according to claim 11, further comprising receiving a status condition of the first power connection terminal of the rechargeable battery from an external device.

13. An electric vehicle comprising:
at least one electric motor;
at least one rechargeable battery, the rechargeable battery including a first power connection terminal portion; and
at least one battery holster configured to receive the rechargeable battery, the at least one battery holster including a second power connection terminal portion configured to contact the first power connection terminal portion when the rechargeable battery is inserted into the at least one battery holster,
wherein the at least one rechargeable battery comprises:
a housing;
a first temperature sensor within the housing to sense a temperature of a portion of the first power connection terminal portion located within the housing, and
a second temperature sensor within the housing to sense a temperature of a portion of the second power connection terminal portion located within the housing,
a battery management system continuously measuring the temperature of the portion of the first power connection terminal located within the housing and the temperature of the portion of the second power connection terminal located within the housing,
wherein the battery management system causes a reduction in an amount of current provided to the at least one electric motor when a temperature difference between the first power connection terminal and the second power connection terminal exceeds one or more thresholds, and wherein at least one of the one or more thresholds is based, at least in part, on a location of the at least one rechargeable battery;
at least one location sensor; and
a communication system, wherein the communication system communicates location information of the rechargeable battery to one or more external devices selected from the group consisting of one or more battery charging kiosks, a network, a computing device, a mobile device, and an electric vehicle.

14. The electric vehicle of claim 13, wherein the first temperature sensor is in direct contact with the portion of the first power connection terminal portion.

15. The electric vehicle of claim 13, wherein the threshold is further based on a total number of charging and/or discharging cycles of the rechargeable battery.

* * * * *